(12) United States Patent
Das et al.

(10) Patent No.: US 6,951,692 B1
(45) Date of Patent: Oct. 4, 2005

(54) NON-VISUALIZED PERMANENT INFORMATION RECORDING SUBSTRATE FOR USE AS A SECURITY LABEL FOR AUTHENTICATION

(75) Inventors: Suresh Das, Trivandrum (IN); Riju Davis, Trivandrum (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/108,183

(22) Filed: Mar. 26, 2002

(51) Int. Cl.$^7$ .............................................. B32B 19/00
(52) U.S. Cl. ...................... 428/690; 428/500; 428/522; 428/523; 428/916; 283/92
(58) Field of Search ................................ 428/690, 500, 428/522, 523, 916, 1.1; 283/92; 252/301.16, 301.35

(56) References Cited

U.S. PATENT DOCUMENTS

| | | | |
|---|---|---|---|
| 4,037,007 A | | 7/1977 | Wood |
| 4,183,989 A | | 1/1980 | Tooth |
| 4,186,020 A | | 1/1980 | Wachtel |
| 4,210,346 A | | 7/1980 | Mowry, Jr. et al. |
| 4,360,548 A | | 11/1982 | Skees et al. |
| 4,726,608 A | | 2/1988 | Walton |
| 5,466,541 A | * | 11/1995 | Van Havenbergh et al. 428/690 |
| 5,565,191 A | * | 10/1996 | Raspanti ...................... 424/59 |
| 5,798,057 A | * | 8/1998 | Hikmet ...................... 252/299.5 |
| 6,165,609 A | * | 12/2000 | Curatolo ...................... 428/343 |
| 6,207,301 B1 | * | 3/2001 | Ohnishi et al. ............. 428/690 |
| 6,297,508 B1 | | 10/2001 | Barmore et al. |

* cited by examiner

Primary Examiner—Rena Dye
Assistant Examiner—Tamra Dicus
(74) Attorney, Agent, or Firm—Perkins Coie LLP (57) ABSTRACT

The present invention relates to an information carrying substrate capable of being applied to a surface for authenticating said surface, and more particularly, the present invention relates to a an information carrying substrate capable of being affixed to a document or a product for authenticating the document or the product and also relates to method for writing an authenticating information on said substrate and further provides a method for authenticating a surface using said substrate.

13 Claims, 12 Drawing Sheets

STR 1##

STR 2##

STR 3##

*FIG. 10A*

STR 4##

STR 5##

STR 6##

*FIG. 10B*

STR 7##

STR 8##

STR9##

FIG. 10C

NON-VISUALIZED PERMANENT INFORMATION RECORDING SUBSTRATE FOR USE AS A SECURITY LABEL FOR AUTHENTICATION

FIELD OF THE INVENTION

The present invention relates to an information carrying substrate capable of being applied to a surface for authenticating said surface, and more particularly, the present invention relates to a an information carrying substrate capable of being affixed to a document or a product for authenticating the document or the product. The present invention also relates to method for writing an authenticating information on said substrate. The present invention further relates to a method for authenticating a surface using said substrate.

BACKGROUND OF THE INVENTION

Counterfeiting of currencies, consumer goods, documents and a host of important articles have become a major menace and threat to civilized social life. These arc just unethical advantages derived of otherwise splendid inventions made world over, such as high-resolution color printers, digital reprographics and other hi-tech duplicating machines and methods.

Although eradication of such unethical practices is not easily possible, there could be efficient methods to prevent and check such acts. Till date there have been several attempts to achieve security coding on products and this has been a challenging job for most companies and governmental organizations. Several methods that have been assimilated are holograms, watermarks, microreplicated patterns, special inks, fluorescent pigments, magnetic materials, mixtures of fluorescent materials etc.

Several of these strategies have posed disadvantages in various aspects and proportions, for example, the method of using a diffraction phenomenon such as a hologram has a problem in that the cost is difficult to be reduced, because a mark must be formed on the original. The method, in which the magnetic material is applied, involves a necessity of bringing the original into contact with the magnetic head in a hermetic manner. Therefore, a problem arises in this case that the apparatus structure becomes too complicated. The method using photochromism suffers a problem in that most photochromic compounds are unstable. The image recognition method must use a great quantity of data to recognize all the various original documents to be protected, resulting in heavy apparatus load and difficulty in cutting the cost. Security ink ribbons currently available are either too costly or lose their security features before the inked fabric reaches its visual end of life.

Various methods of providing documents, such as negotiable instruments, with tamper evident systems to prevent alteration have been proposed. Likewise, systems have also been developed to prevent reproduction of documents by photocopying to reduce the incidence of fraud. However, in recent years advanced color copiers, which are readily accessible to the general public, can produce nearly exact duplicates of the original document. It is very difficult for the untrained person to distinguish the original from an illicit reproduction. To prevent passing off of the reproduction as the original, efforts have been made to make the original document incapable of being copied or to incorporate authenticating systems into the document. One known method of producing a paper that is useful for preventing fraud in security documents is to print the paper with a chemical in the form of an invisible image. When a bleach solution or an ink eradicator is applied over the area of the invisible image, a colored image appears to confirm its authenticity. However, this method is often undesirable because the bleach solution is corrosive, the ink eradicator contains toxic solvents, and the solution tends to warp or otherwise permanently damage the document. Another method is to print a document with fluorescent ink, which is colorless under visible light, but becomes discernible when exposed to ultra-violet light. Similarly, fluorescent ink may be printed on a document for automatic identification by an electronic scanner such as that disclosed in an U.S. Pat. No. 4,186,020 to Wachtel. The use of fluorescent ink requires access to a source of ultraviolet light or a document verifying electronic scanner. This prevents quick and easy verification of the document. A further prior method is disclosed in another U.S. Pat. No. 4,183,989 to Tooth in which security paper is provided with a strip, thread or planchette having at least two machine verifiable security features, one of which is a magnetic material and a second of which is a luminescent material, an X-ray absorbent or a metal. Since most security documents are printed paper products with different base weight, color and texture requirements, the availability of various papers having these security features is very limited. This system also has the disadvantage of requiring specialized and expensive verifying machines to examine the documents and determine its authenticity. An U.S. Pat. No. 4,726,608 to Walton discloses the use of an opaque coating over authenticating indicia. The image of the indicia is later made visible by scratching off the opaque coating or by applying a solvent to disperse the coating. This system further has the disadvantage of either requiring solvents or producing unwanted dust. Still another method identifying forgeries is by micro-printing where a message, logo, or name is printed in very small type as a border around the face of the document. Generally, the message cannot be read by the naked eye, and requires some magnification to make it legible. Copiers cannot duplicate the micro-printing with sufficiently high resolution, so that on a copy the words become Just a broken line or blur. However, the tellers at a bank or persons accepting the document generally do not have access to magnifiers and thus, a copy will not be easily noticeable. "Sunburst" or "Rainbow" printing is sometimes used to help defeat color copiers in which the document is printed with one intense color at one side of the document which slowly fades into another color across the width of the paper. Eventually the second color intensifies at the opposite side. This is a visual system that is difficult to duplicate on a copier. If the original printing is not available for comparison, it is extremely difficult for the untrained eye to know whether it is a copy or authentic. Another method is disclosed in an U.S. Pat. No. 4,210,346 to Mowry Jr. et al. in which "VOID" or other warning messages is preprinted in halftone or multitone on the document to camouflage the pre-printing. These pre-printed messages are blended into the surroundings of the document so that the human eye sees them as a uniform printing. The pre-printed "VOID" or warning messages will appear on the illegal copy by many color copiers. However, more sophisticated color copiers have been developed in recent years so that a skillful lawbreaker can now reproduce a security document without the preprinted warning messages appearing on the copies. Another method of reducing the risk of fraud is to incorporate a color forming substance into the substrate of the document. To verify the authenticity of a document, a second color forming substance, which is capable of taking part in a color-forming reaction, is applied to the security document to reveal the hidden images or produce color changes. Examples of this form of detection system are disclosed in the U.S. Pat. No. 4,037,007 to Wood and U.S. Pat. No. 4,360,548 to Skees et al. However, the second color forming substance is not generally available at every location where the security documents are handled or whenever it is needed. Thus, these documents can not be readily tested for their authenticity. The above noted security and authentication systems have not entirely prevented unauthorized or fraudulent reproduction of documents. Accordingly, a need still exists for a simple and efficient system, which is able to accurately authenticate a document and distinguish it from a reproduction.

Photochromism, a useful and simple technique, has been extensively employed in the fields of optical memories and imaging. However, most attempts adopting this phenomenon have confronted with a basic material drawback that the created images are destroyed by photoreactions during the "read" process. The wavelength of light used in the various stages of photoinduced imaging, such as "write", "read" and "erase", are usually the same or fall in the region where the different forms of the photochromic molecule absorb. Hence, repetitive "read" process even with low intensity light induces the same reaction as "writing" or "erasing" thus causing destruction of created images. Tamaoki et al. have improved upon this strategy with azobenzene derived photochromic molecules, whose photoisomerization process showed a dependence on the intensity of photolysing light. This makes the system more efficient, as the "write" process requires a high intensity light whereas the "read" process requires only low intensity light thereby protecting the created images. However, the "read" process with these materials required an additional fluorescent film for viewing the photoinduced impressions since the photochromic material by itself is not fluorescent. It would be ideal to have inherently fluorescent systems wherein the fluorescence can be destroyed during the "write" process using light of high intensity. This would permit the "read" process to be carried out with no external aid other than exposure to a low intensity ultraviolet light whereby the image will become clear to the naked eye, without resulting in blurring or erasure of the written image.

Fluorescent labels as a technique for security coding and anti-counterfeit labeling are widely used due to the case and reliability of the method. Although several reports and patents focus on this theme, a need still exists for a simple, cost-effective, efficient, and reliable system which is able to accurately authenticate a document and distinguish it from its spurious version. In most fluorescent labels the authentication procedure needs sophisticated instrumentation to detect and verify the authenticity of the secret imaging or coding. Also the resolution of the image would be limited, since in most cases of imaging using fluorescent materials, these are deposited on a substrate in a required pattern or shape. This method however has a limitation to its resolution and will also be reproducible using several techniques. A methodology using light for writing the image or information provides a high resolution and an additional tamper-proof feature to the label. We report fluorescent labeling materials and methods of imaging them with light resulting in recording of permanent and invisible information which can be easily read using handy ultraviolet lamps. Such labels can bear images with high resolution as it involves light induced writing.

The use of fluorescent labels for security coding and anti-counterfeit labeling is of interest due to the ease and reliability of the method. Although several reports and patents focus on this theme, a need still exists for a simple, cost-effective, efficient, and reliable system which is able to accurately authenticate a document and distinguish it from its spurious version An earlier patent (U.S. Pat. No. 4,186,020) has described the use of ink containing a fluorescent compound, which is printed in a predetermined pattern. Here the ink is printed on a predetermined pattern on a portion of a label and a protective layer is applied over it. The predetermined pattern is either in the form of a bar code or a readily identifiable design. Such techniques have a drawback that the labels can be easily tampered with since the image is printed onto the label at the final stage.

Another method involving the use of photoluminescent materials for authentication purposes is described in U.S. Pat. No. 6,165,609. This patent describes a method of incorporating a taggant compound in a film forming material. The taggant molecule is generally invisible to the naked eye and on irradiation with UV light, the taggant molecule emits light of a different wavelength. Authentication is then carried out by comparing the emitted wavelength with the wavelength of light know to be emitted by the taggant molecule. The light emitted by the taggant is determined by detector capable of determining the wavelength of light emitted. (U.S. Pat. No. 6,297,508) and compared with the expected wavelength of emission.

A more recent patent (U.S. Pat. No. 6,297,508) has described an improved version of this patent in which more than one taggant compound is used in the label. Thus the fluorescent spectrum emitted by such a label will be complex depending upon the nature of the taggant molecules as well the proportion of the two molecules in the label. Such a mixed taggant label will be more difficult to replicate than labels containing a single taggant material.

A problem with the simple use of fluorescent taggant molecules in labels is that once the counterfeiter is aware of the photoluminescer or the combination of the photoluminescers then reproduction of the labels becomes fairly simple. Also photodetectors are required for authenticating the emitted wavelength from such fluorescent labels.

In view of these limitations, incorporation of additional features into fluorescent labels which would make reproduction of the labels even more difficult is desirable. In this patent we describe the use of fluorescent materials as labels onto which different images can be patterned using light of a specific wavelength and intensity. Thus it would be possible for light of specific intensity and wavelength to make desired markings on the labels using suitable masks thus providing an added security feature compared to the fluorescent labels described in the earlier patents. The fluorescent materials used in these labels have been specially selected such that irradiation of the labels with light of specific wavelengths and intensity can result in loss of fluorescence in the irradiated portions.

DETAILED DESCRIPTION OF THE PRESENT INVENTION

Accordingly, the present invention provides an information carrying substrate applicable to a surface of a product for authenticating the product, said substrate comprising 50 to 99.999% by weight of a film forming material, 0.001 to 5% by weight of a photo-switchable fluorescent compound having the general formula:

wherein $R_1$ and $R_2$ are substituted phenyl groups and n=1 to 3 uniformly dispersed in said film forming material and remaining, a solvent dissolving the film forming material, said photo-switchable fluorescent compound can be isothermally switched ON or OFF in a irreversible manner, wherein informations is written upon the substrate by subjecting the substrate to an ultraviolet light source having wavelength in the range of 390 to 700 nm and amplitude above 2 mJ/Pulse and the information thus written is read by subjecting the substrate to an ultraviolet light source having wavelength in the range of 390 to 700 nm and amplitude below 0.5 mJ/pulse.

In an embodiment of the present invention, the substituents are selected from H, CN, F, $NO_2$, Br, Cl, $CH_3$, $N(CH_3)_2$, indanedione, barbituric acid, malonodinitrile, meldrums acid, $O(CH_2)_X CH_3$; where X=0 to 18.

In another embodiment of the present invention, the substituents are $O(CH_2)_X CH_3$; wherein X=0 to 12 and CN.

In yet another embodiment of the present invention, said photo-switchable fluorescent compound possess strong solid state fluorescence.

In still another embodiment of the present invention, said photo-switchable fluorescent compound is capable of being switched thermally and photo-chemically.

In a further embodiment of the present invention, the film forming material is selected from the group comprising of polymethylmethacrylate, polystyrene and polyvinylalcohol or mixtures thereof.

In one more embodiment of the present invention, the solvents are selected from the group comprising of acetone, chloroform, ethylacetate, dichloromethane and methanol.

In one another embodiment of the present invention, the substrate is applied or surfaces selected from the group comprising of metal, plastic, glass, polymer sheets or any other surface which is not damaged or is soluble in the solvent used.

In an embodiment of the present invention, the information carrying substrate is non-fluorescent in ordinary light but turns fluorescence when kept under low intensity UV light source.

In another embodiment of the present invention, the fluorescence of the substrate in low intensity UV radiation is irreversible switched OFF when the substrate is subjected to high intensity UV source.

In yet another embodiment of the present invention, the information is recorded on the substrate by placing an information containing mask in front of the coated substrate and irradiating with a high intensity UV source.

In still another embodiment of the present invention, the UV light source emits light having wavelength in the range of 390 to 700 nm and amplitude above 2 mJ/Pulse.

The present invention further provides a method for authenticating a product, said method comprising (a) applying an information carrying substrate comprising 50 to 99.999% by weight of a film forming material, 0.001 to 5% by weight of a photo-switchable fluorescent compound of the general formula:

wherein $R_1$ and $R_2$ are substituted phenyl groups and n=1 to 3 uniformly dispersed in said film forming material and the remaining being a solvent capable of dissolving the film forming material on an upper or a lower surface of the product, wherein said photo-switchable fluorescent compound can be isothermally switched ON or OFF in a reversible manner, (b) drying the substrate, and (c) writing an authenticating information upon the medium by conventional techniques that may be read by placing the information recording medium under low intensity ultraviolet light source.

In an embodiment of the present invention, the substituents are selected from H, CN, F, $NO_2$, Br, Cl, $CH_3$, $N(CH_3)_2$, indanedione, barbituric acid, malonodinitrile, meldrums acid, $O(CH_2)_X CH_3$; where X=0 to 18.

In another embodiment of the present invention, the substituents are $O(CH_2)_X CH_3$; wherein X=0 to 12 and CN.

In yet another embodiment of the. present invention, said photo-switchable fluorescent compound possess strong solid state fluorescence.

In still another embodiment of the present invention, said photo-switchable fluorescent compound is capable of being switched thermally and photo-chemically.

In a further embodiment of the present invention, the film forming material is selected W from the group comprising of polymethylmethacrylate, polystyrene and polyvinylalcohol or mixtures thereof.

In one more embodiment of the present invention, the solvents are selected from the group comprising of acetone, chloroform, ethylacetate, dichloromethane and methanol.

In one another embodiment of the present invention, the substrate is applied or surfaces selected from the group comprising of metal, plastic, glass, polymer sheets or any other surface which is not damaged or is soluble in the solvent used.

In an embodiment of the present invention, the information carrying substrate is non-fluorescent in ordinary light but turns fluorescence when kept under low intensity UV light source.

In another embodiment of the present invention, the fluorescence of the information carrying substrate in low intensity UV radiation is irreversible switched OFF when the substrate is subjected to high intensity UV source.

In yet another embodiment of the present invention, the information is recorded on the substrate by placing an information containing mask in front of the substrate and irradiating with a high intensity UV source.

In still another embodiment of the present invention, the UV light source emits light having wavelength in the range of 390 to 700 nm and amplitude above 2 mJ/Pulse.

In a further embodiment of the present invention, the information written on the substrate is read by subjecting the information carrying medium to a UV light source having very low amplitude.

We present here our invention on a very efficient fluorescence imaging material, with permanent and secret writing properties, based on fluorescent compounds dispersed in a polymer film. The photoreactions of these compounds, when dispersed in a polymer film were found to be dependent on the intensity of the photolysing light. Whereas high intensity ultraviolet light caused the photoreactions of these compounds, the process was not observed using low intensity ultraviolet light. The high intensity light formed non-fluorescent marks on the fluorescent polymer film. The polymer film before and after photolysis appeared transparent under normal light (room light) whereas in the presence of low intensity UV radiation the image created was clearly visible and remained unaltered even on prolonged exposure (>3 hours).

Polymer films with the fluorescent compounds dispersed in it were obtained by spreading a viscous solution, obtained by dissolving the required polymers and the fluorescent molecule in a suitable solvent, over a suitable substrate by spin coating. Photomasks for imaging were obtained by printing the required images, on transparent polymer sheets, using a laser printer. An imaging sample cell set up consisted of a polymer film coated on the substrate above which the photomask was placed. High intensity ultraviolet light was used as the light source for the "write" process (schematically shown in FIG. 5). After the imaging is completed the polymer film looks unaltered in room light (schematically shown in FIGS. 6A and 7). Under low intensity UV light the image created becomes clearly visible (schematically shown in FIGS. 6B and 8). The low intensity UV light used for the "read" process did not cause any damage or erasure of the recorded image. in other words it is not possible to write on such a polymer film using low intensity UV radiation. The photoprocesses of the fluorescent compound that take place upon irradiation with high intensity light are thermally irreversible, making the image a permanent one. The fluorescent lamp used for reading the information contains wavelength of light used for the writing process. However since the photochemical process required for switching off the fluorescence occurs only with high intensity UV light, the reading process which involves use of low intensity UV light does not result in further writing. Thereby the image retains its clarity even on extended exposure to the low intensity UV light. No fading or blurring of the image was observed. The major advantage of this system is that there is a threshold energy for the writing process below which the photoprocess does not occur.

It may be highlighted that the secret coding made possible by these materials may be incorporated into currency notes with the image of its denomination or an emblem to mark its authenticity. To cite another useful application of such imaging, it may be incorporated into passports issued where the name of the passport holder may be imaged into the film. The film may then be placed between to two well-pasted plain papers. The image would still be clear under UV radiation. When each passport bears the name of its holder as a permanent marking, the case of forgery is restricted substantially. Any serious attempts to alter the name inscribed would only damage the material. Currently in the passports issued there is no such secret name inscription, which may be a good reason to several cases of passport forgery. Inscription of such imaging on any object would make it a near fool proof and full proof to its authenticity. The application of such imaging in textile shops, supermarkets and on consumer products could be similarly envisaged. A useful incorporation of such labels would be in valuable documents such as certificates, where forgery is prevented on trying to duplicate the certificates even on using the best copiers available.

INCLUDED STRUCTURES IN THE INVENTION

1. #STR1# represents 4-cyano, 4-methoxy-1,4-diphenylbutadiene
2. #STR2# represents 4-cyano, 4-butyloxy-1,4-diphenylbutadiene
3. #STR3# represents 4-cyano, 4-octyloxy-1,4-diphenylbutadiene
4. #STR4# represents 4-cyano, 4-dodecyloxy-1,4-diphenylbutadiene
5. #STR5# represents 4-cyano, 4-methoxystilbene
6. #STR6# represents 4-cyano, 4-butyloxystilbene
7. #STR7# represents 4-cyano, 4-octyloxystilbene
8. #STR8# represents 4-cyano, 4-dodecyloxystilbene
9. #STR9# represents 2-[3-(4-N,N-dimethylaminophenyl) prop-2-enylidene]indane-1,3-dione

EXAMPLE 1

Synthesis of #STR1#, #STR2#, #STR3# and #STR4#

STR1#, #STR2#, #STR3# and #STR4# were prepared by Wittig reaction between freshly prepared 4-alkyloxycinnamaldehyde and 4-(methylene-triethylphosphoniumbromide)-cyanobenzene. The crude product was purified using column chromatography over silica gel (100–200) and a mixture (1:99) of ethyl acetate and hexane as the eluent. The compound was further purified by recrystallization using a mixture of ethyl acetate and hexane.

Characteristics of #STR1# thus obtained are given below:
Yield: 40%; melting point: 175° C.; UV-Vis (MeCN): $\lambda$max, 356 nm ($\epsilon$, 44000 mol$^{-1}$ cm$^{-1}$); IR (KBr) υmax: 2926, 2857, 2356, 2230, 1735, 1680, 1603, 1511, 1475, 1306, 1258, 1176, 1027, 984, 857, 800 cm$^{-1}$; $^1$H NMR (CDCl$_3$,00 MHz): δ 3.85 (3H s, OCH$_3$), 6.60–663 (1H, dd, $^3J_{c,d}$=15.38 Hz, olefinic), 6.72–6.75 (1H, dd, $^3J_{a,b}$=15.38 Hz, olefinic), 6.82–6.88 (1H, dd, $^3J_{a,b}$=15.38 Hz, $^3J_{b,c}$=10.25 Hz, olefinic), 6.90–6.92 (2H, d, $^3J_{1,2}$=8.3 Hz, aromatic), 7.02–7.08 (1H, dd, $^3J_{c,d}$=15.38, $^3J_{b,c}$=10.25 Hz, olefinic), 7.41–7.43 (2H, d, $^3J_{1,2}$=8.3 Hz, aromatic), 7.49–7.51 (2H, d, $^3J_{3,4}$=8.1 Hz, aromatic), 7.60–7.62 (2H, d, $^3J_{3,4}$=8.1 Hz, aromatic).

Characteristics of #STR2# thus obtained are given below:
$^1$NMR (CDCl$_3$, 300 MHz): δ 0.85–0.88 (3H, t, CH$_3$—), 1.26–1.45 (2H, m, CH$_2$), 1.73–180 (2H, m, CH$_2$CH$_2$O), 3.94–3.99 (2H, t, OCH$_2$), 6.55–6.61 (1H, dd, $^3J_{c,d}$=15.38 Hz, olefinic), 6.68–6.73 (1H, dd, $^3J_{a,b}$=15.38 Hz, olefinic), 6.78–6.86 (1H, dd, $^3J_{a,b}$=15.38 Hz, $^3J_{b,c}$=10.25 Hz, olefinic), 6.86–6.88 (2H, d, $^3J_{1,2}$=8.3 Hz, aromatic), 6.99–7.07 (1H, dd, $^3J_{c,d}$=15.38, $^3J_{b,c}$=10.25 Hz, olefinic), 7.37–7.39 (2H, d, $^3J_{1,2}$=8.3 Hz, aromatic), 7.46–7.50 (2H, d, $^3J_{3,4}$=8.1 Hz, aromatic), 7.57–7.60 (2H, d, $^3J_{3,4}$=8.1 Hz, aromatic).

Characteristics of #STR3# thus obtained are given below:
$^1$H NMR (CDCl$_3$, 300 MHz): δ 0.85–0.88 (3H, t, CH$_3$—), 1.26–1.45 (10H, m, (CH$_2$)$_5$), 1.73–1.80 (2H, m, CH$_2$CH$_2$O), 3.94–3.99 (2H, t, OCH$_2$), 6.55–6.61 (1H, dd, $^3J_{c,d}$=15.38 Hz, olefinic), 6.68–6.73 (1H, dd, $^3J_{a,b}$=15.38 Hz, olefinic), 6.78–6.86(1H, dd, $^3J_{a,b}$=15.38 Hz, $^3J_{b,c}$=10.25 Hz, olefinic), 6.86–6.88 (2H, d, $^3J_{1,2}$=8.3 Hz, aromatic), 6.99–7.07 (1H, dd, $^3J_{c,d}$=15.38, $^3J_{b,c}$=10.25 Hz, olefinic), 7.37–7.39 (2H, d, $^3J_{1,2}$=8.3 Hz, aromatic), 7.46–7.50 (2H, d , $^3J_{3,4}$=8.1 Hz, aromatic), 7.57–7.60 (2H, d, $^3J_{3,4}$=8.1 Hz, aromatic).

Characteristics of #STR4# thus prepared is given below:
Yield: 40%; melting point: K(crystal) 96.9° C. N (Nematic Liquid crystalline phase) 171.9° C. I(isotropic phase); UV-Vis (MeCN): λmax, 356 nm (ε, 44000 mol$^{-1}$ cm$^{-1}$); 1R (KBr) νmax: 2926, 2857, 2356, 2230, 1735, 1680, 1603, 1511, 1475, 1306, 1258, 1176, 1027, 984, 857, 800 cm$^{-1}$; $^1$H NMR (CDCl$_3$, 300 MHz) δ 0.85–0.88 (3M, t, CH$_3$—), 1.26–1.45 (18H, m, (CH$_2$)$_9$), 1.73–1.80 (2H, m, CH$_2$CH$_2$O), 3.94–3.99 (2H, t, OCH$_2$), 6.55–6.61 (1H, dd, $^3J_{c,d}$=15.38 Hz, olefinic), 6.68–6.73 (1H, dd, $^3J_{a,b}$=15.38 Hz, olefinic), 6.78–6.86 (1H, dd, $^3J_{a,b}$=15.38 Hz, $^3J_{b,c}$=10.25 Hz, olefinic), 6.86–6.88 (2H, d, $^3J_{1,2}$=8.3 Hz, aromatic), 6.99–7.07 (1H, dd, $^3J_{c,d}$=15.38, $^3J_{b,c}$=10.25 Hz, olefinic), 7.37–7.39 (2H, d, $^3J_{1,2}$=8.3 Hz, aromatic), 7.46–7.50 (2H, d, $^3J_{3,4}$=8.1 Hz, aromatic), 7.57–7.60 (2H, d, $^3J_{3,4}$=8.1 Hz, aromatic).

EXAMPLE 2

Synthesis of #STR5#, #STR6#, #STR7# and #STR8#

STR5#, #STR6#, #STR7# and #STR8# were synthesized by Wittig reaction between freshly prepared 4-alkyloxybenzaldehyde with 4-(methylene-triethylphosphoniumbromide)-cyanobenzene. The crude product was purified using column chromatography over silica gel (100–200) and a mixture (1:99) of ethyl acetate and hexane as the eluent. The compound was further purified by re-crystallization using a mixture of ethyl acetate and hexane.

Characteristics of #STR5# thus obtained are given below:
$^1$H NMR (CDCl$_3$, 300 MHz): δ 3.85 (3H, s, OCH$_3$), 6.82–6.84 (2H, d, $^3J_{c,d}$=8.3 Hz, aromatic), 684–6.89 (1H, d, $^3J_{a,b}$16.27 Hz, olefinic), 7.06–7.12 (1H, d, $^3J_{a,b}$=16.27 Hz, olefin), 7.37–7.40 (2H, d, aromatic), 7.45–7.48 (1H, d, aromatic), 7.52–7.55 (2H, d, $^3J_{1,2}$=8.3 Hz, aromatic).

Characteristics of #STR6# thus obtained given below:
$^1$ NMR (CDCl$_3$, 300 MHz): δ 0.89–0.93 (3H, t, CH$_3$—), 1.39–1.46 (2H, m, CH$_2$), 1.66–175 (2H, m, CH$_2$CH$_2$O), 3.90–3.94 (2H, t, OCH$_2$), 6.82–6.84 (2H, d, $^3J_{c,d}$=8.3 Hz, aromatic), 6.84–6.89 (1H, d, $^3J_{a,b}$=16.27 Hz, olefinic), 7.06–7.12 (1H, d, $^3J_{a,b}$=16.27 Hz, olefinic), 7.37–7.40 (2H, d, aromatic), 7.45–7.48 (1H, d, aromatic), 7.52–7.55 (2H, d, $^3J_{1,2}$=8.3 Hz, aromatic).

Characteristics of #STR7# thus obtained given below:
$^1$H NMR (CDCl$_3$, 300 MHz): δ 0.85–0.88 (3H, t, CH$_3$—), 1.26–1.45 (10H, m, (CH$_2$)$_5$), 1.73–1.80 (2H, m, CH$_2$CH$_2$O), 3.94–3.99 (2H, t, O CH$_2$), 6.82–6.84 (2H, d, $^3J_{c,d}$=8.3 Hz, aromatic), 6.84–6.89 (1H, d, $^3J_{a,b}$=16.27 Hz, olefinic), 7.06–7.12 (1H, d, $^3J_{a,b}$=16.27 Hz, olefinic), 7.37–7.40 (2H, d, aromatic), 7.45–7.48 (1H, d, aromatic), 7.52–7.55 (2H, d, $^3J_{1,2}$=8.3 Hz, aromatic).

Characteristics of #STR8# thus obtained given below:
$^1$H NMR (CDCl$_3$, 300 MHz): δ 0.85–0.88 (3H, t, CH$_3$—), 1.26–1.45 (18H, m, (CH$_2$)$_9$), 1.73–1.80 (2H, m, CH$_2$CH$_2$O), 3.94–3.99 (2H, t, OCH$_2$), 6.82–6.84 (2H, d, $^3J_{c,d}$=8.3 Hz, aromatic), 6.84–6.89 (1H, d, $^3J_{a,b}$=16.27 Hz, olefinic), 7.06–7.12 (1H, d , $^3J_{a,b}$=16.27 Hz, olefinic), 7.37–7.40 (2H, d, aromatic), 7.45–7.48 (1H, d, aromatic), 7.52–7.55 (2H, d, $^3J_{1,2}$=8.3 Hz, aromatic).

EXAMPLE 3

Synthesis of #STR9#

To a solution of 1,3-indanedione in 1,4-dioxane, 2 to 3 drops of triethylamine were added. To the above mixture equimolar amount of dimethylaminobenzaldehyde was added and the mixture was stirred at room temperature (30° C.) for 5 hrs. The reaction mixture was poured into cold water and filtered out the crude product.

The compound was purified through chromatography over silica gel (100–200 mesh) using a mixture (1.4) of ethyl acetate and hexane as the eluent. Re-crystallization from a mixture (4.1) of ethyl acetate and hexane gave compound in the form of deep red crystals.

Characteristics of #STR9# thus obtained are given below:
Yeild (70%): melting point: 250–251° C., $^1$H NMR (CDCl$_3$) δ 3.18 (6H, s, NMe$_2$), 6.69–6.71(1H, d, vinylic), 7.59–7.62(1H, d, vinylic), 7.63–7.9(8H, m, aromatic), 8.23–8.32(1H,dd, vinylic).

EXAMPLE 4

STR1#, #STR2#, #STR3#, #STR4#, #STR5#, #STR6#, #STR7# and #STR8# exhibit liquid crystalline nature with wide temperature ranges. The liquid crystalline phases of these derivatives can be photochemically switched from smectic/nematic to isotropic state and back.

TABLE 1

Phase transition temperatures and thermodynamic parameters of #STR1#, #STR2#, #STR3# and #STR4#

| Compound | Phase transition temperatures (° C.)[i] | ΔH (kJmol$^{-1}$) | ΔS (JK$^{-1}$mol$^{-1}$) |
|---|---|---|---|
| #STR1# | K 175.3 N 213 I | 21.1 (K-N) | 47.0 (K-N) |
| #STR2# | K 145.5 N 209.1 I | 25.8, 0.4 | 85.1, 0.9 |
| #STR3# | K 105.3 S 159.6 N 186.6 I | 36.2, 0.4 (N-I) | 95.7, 0.9 (N-I) |
| #STR4# | K 96.9 S 171.9 I | 46.2, 3.2 | 124.7, 7.6 |

[i]K = crystalline, N = nematic, S = smectic A and I = isotropic

EXAMPLE 5

STR1#, #STR2#, #STR3# and #STR4# exhibit liquid crystalline phases that can be switched on and off photochemically. For example, #STR4# shows the following phase transition temperatures, crystalline to smectic A at 96.9° C. and smectic A to isotropic at 171.9° C. At 120° C. where #STR4# shows a clear smectic A phase the sample was irradiated using 360 nm light from a high-pressure mercury lamp equipped with an Oriel 360 nm band pass filter. The smectic A phase transformed isothermally into an isotropic state. The material was no longer liquid crystalline at any temperature and the light induced change was found to be thermally irreversible. The phase transition temperatures of the new mixture is crystalline to isotropic at 80° C. The smectic A phase could be regenerated upon irradiation of the above mixture using 266 nm laser (fourth harmonic of Quanta Ray OCR-12 Nd:YAG laser, 10 ns pulse width and energy 15 mJ). The 266 nm laser irradiation was carried out after cooling the isotropic mixture to room temperature.

EXAMPLE 6

STR1#, #STR2#, #STR3#, #STR4#, #STR5#, #STR6#, #STR7# and #STR8# exhibit strong solid state fluorescence.

The solid state fluorescence of these compounds shows a dependence on the length of their alkyloxy chain. For example the short alkyloxy chain substituted compound #STR1# shows a strong green solid state fluorescence and the long alkyloxy chain substituted compound #STR4# show a strong blue fluorescence. FIGS. 1–4 show the solid slate fluorescence of #STR1#, #STR2#, #STR3#, #STR4#, respectively.

EXAMPLE 7

Figure 1:
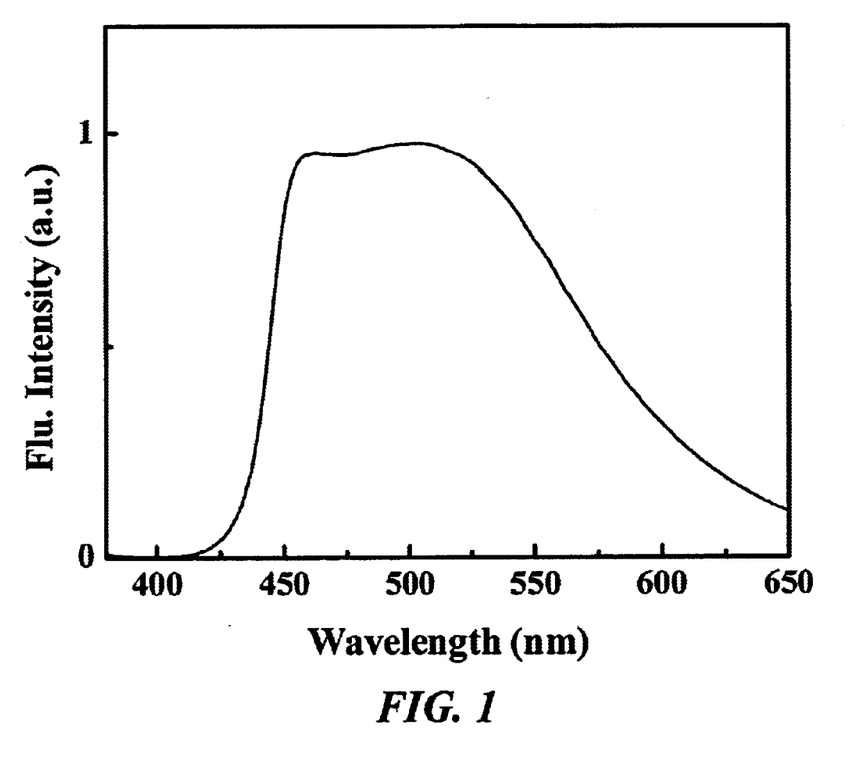
FIG. 1: Solid state fluorescence spectrum of compound of #STR1#
Figure 2:
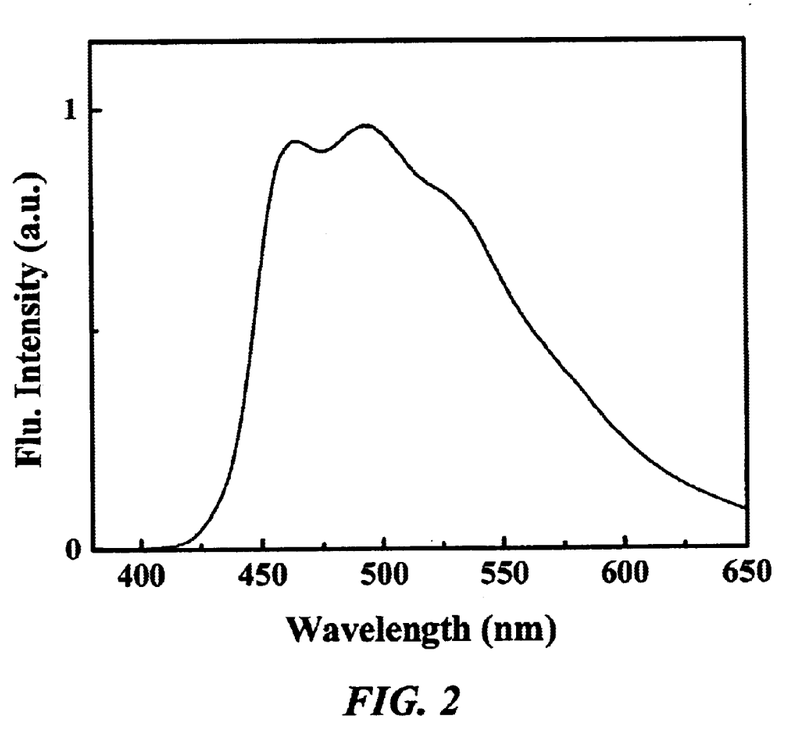
FIG. 2: Solid state fluorescence spectrum of compound of #STR2#
Figure 3:
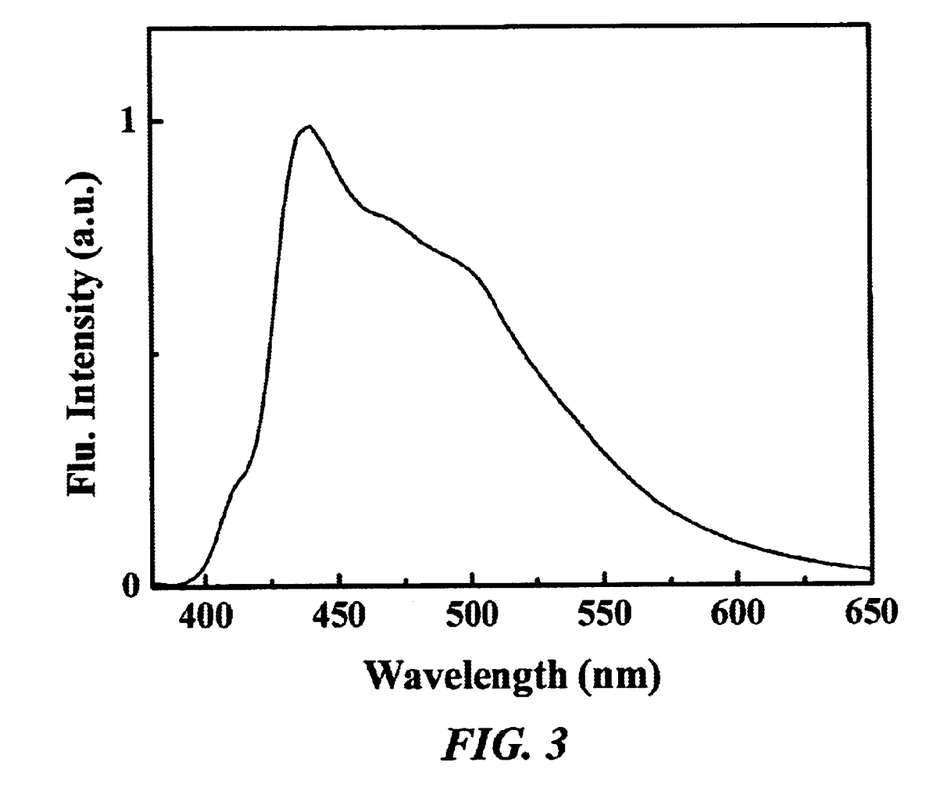
FIG. 3: Solid state fluorescence spectrum of compound of #STR3#
Figure 4:
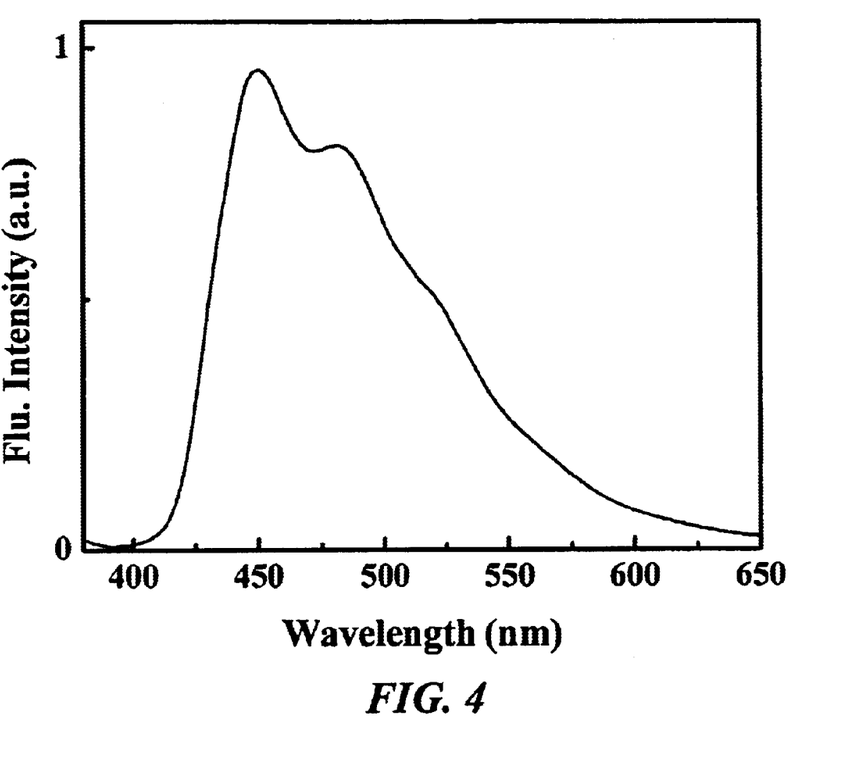
FIG. 4: Solid state fluorescence spectrum of compound of #STR4#
Figure 5:
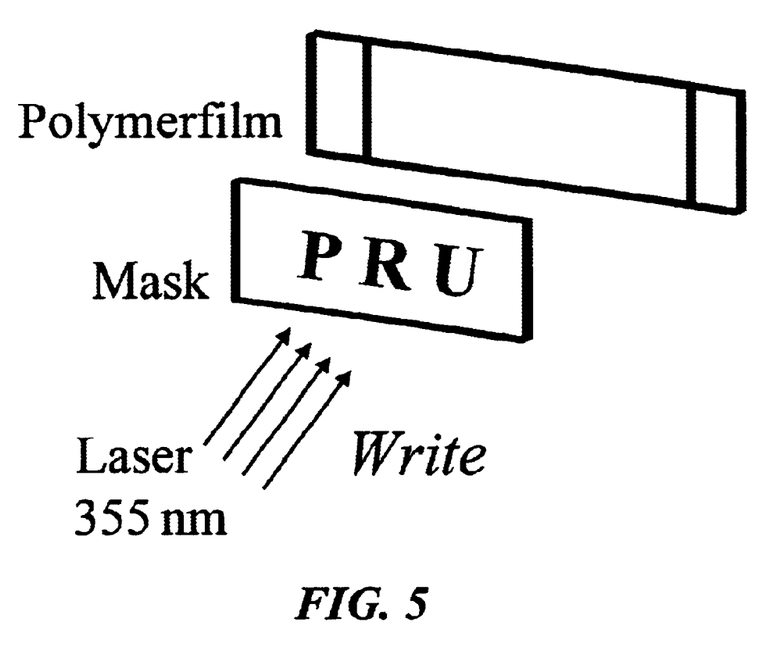
FIG. 5: Schematic representation of the "write" process for imaging on the polymer films.
Figure 6A:
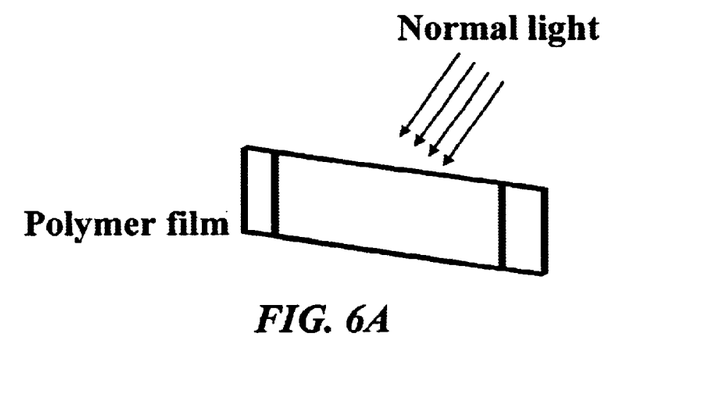
FIG. 6A: Schematic representation of the "read" process under normal light.
Figure 6B:
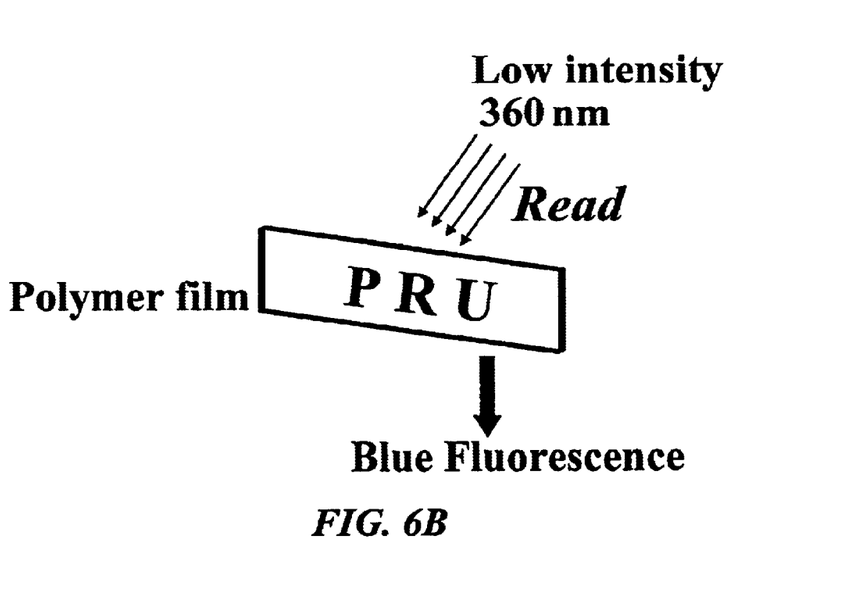
FIG. 6B: Schematic representation of "read" process under low intensity ultraviolet (UV) light.
Figure 7:
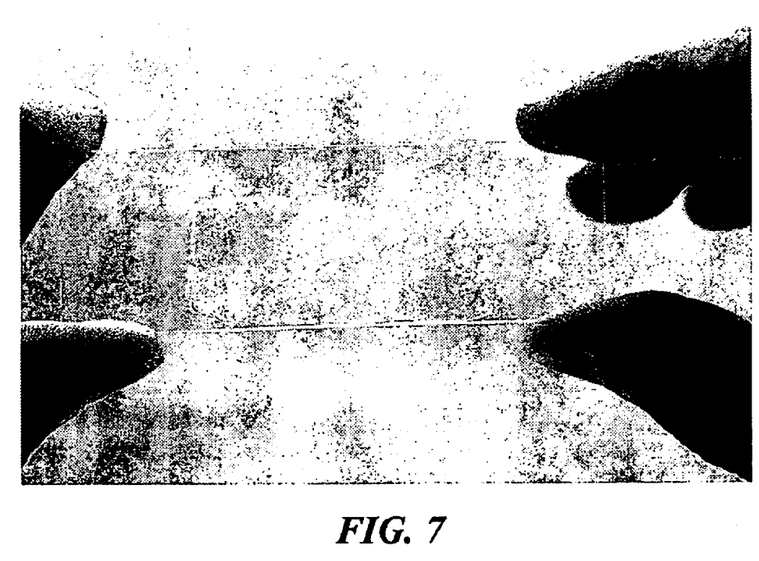
FIG. 7: Photograph of the polymer film held under normal light
Figure 8:
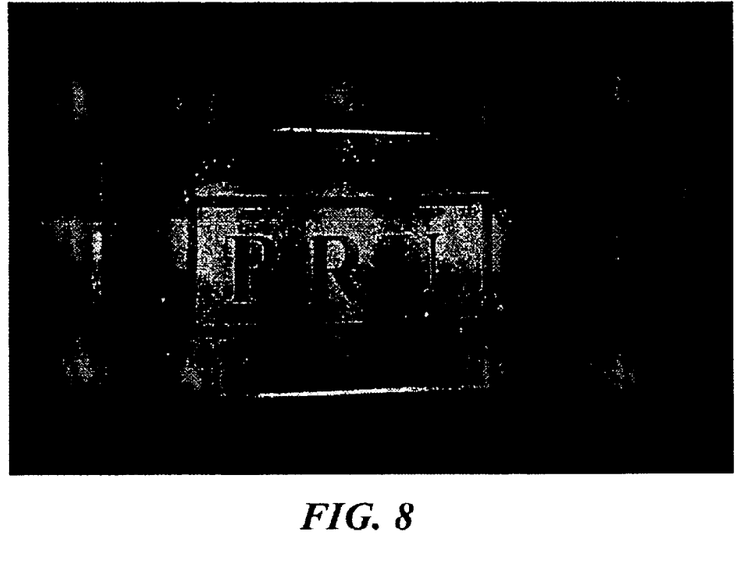
FIG. 8: Photograph of the polymer film, with inscription PRU, exposed to low intensity UV light
Figure 9:
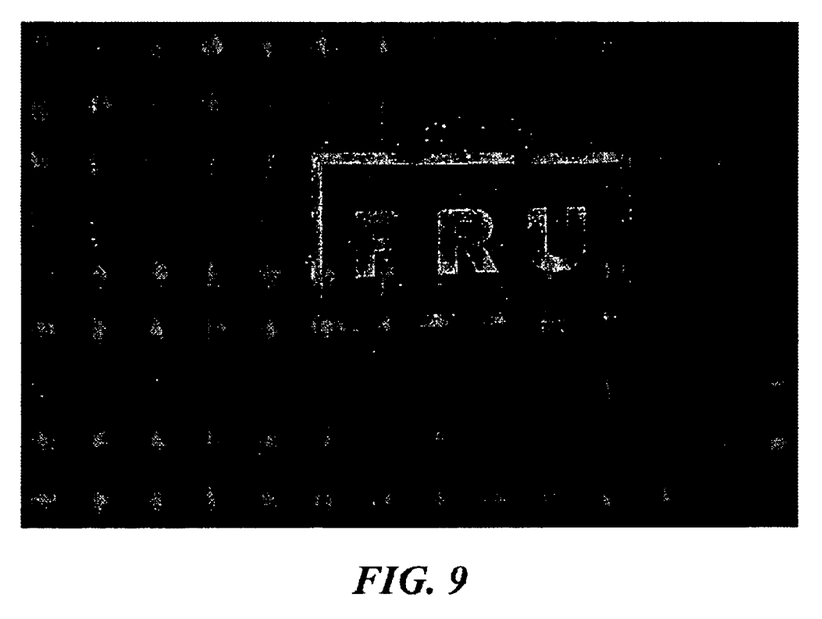
FIG. 9: Photograph of the polymer film with inscription PRU, using a negative photomask, on a polymer film exposed to low intensity UV light

A fluorescent compound such as #STR1#, #STR2#, #STR3#, #STR4# or their mixtures were dispersed in a suitable polymer such as polymethylmethacrylate (PMMA) by dissolving the polymer and fluorescent material in a suitable solvent such as chloroform. The solvent was evaporated to obtain a viscous solution of the fluorescent compound dispersed in PMMA. The obtained viscous solution was spread on a substrate such as a glass slide either by spin casting or by uniformly applying over it. The solvent from the film was removed by leaving the coated glass slide in the open for about 3 hrs. A typical imaging sample cell consisted of a polymer Him coated glass slide above which the required photomask was placed. Pulsed laser (355 nm, third harmonic of Nd:YAG, 20 mJ, 10 ns pulse width) was used as the source of light for the "write" process (FIG. 5). Laser light was flashed on the photomask for less than a minute. The optimum time was observed to be 15 seconds per cm². Under normal light, the image on the polymer film is not visible (FIGS. 6A and 7), The image or information inscribed on. the polymer films become visible when they are exposed to low intensity ultraviolet light of wavelength 350 nm (Rayonct Photochemical Reactor Lamp, Cat. No. RPR 3500 Å) (FIGS. 6B and 8). The image obtained using a negative photomask is shown in FIG. 9.

EXAMPLE 8

A fluorescent compound such as #STR5#, #STR6#, #STR7#, #STR8# or their mixtures were dispersed in a suitable polymer such as polymethylmethacrylatc (PMMA) by dissolving both the substances in a suitable solvent such as chloroform. The solvent was evaporated to obtain a viscous solution of the fluorescent compound dispersed in PMMA.. The obtained viscous solution was spread on a substrate such as a glass slide either by spin casting or by uniformly applying over it. The solvent from the film was removed by leaving the coated glass slide in the open for about 3 hrs. A typical imaging sample cell consisted of a polymer film coated glass slide above which the required photomask was placed. Pulsed laser (355 nm, third harmonic of Nd:YAG, 20 mJ, 10 ns pulse width) was used as the source of light for the "write" process Laser light was flashed on the photomask for less than a minute. The optimum time was observed to be 15 seconds per cm². The image or information inscribed on the polymer films become visible when they are exposed to low intensity ultraviolet light of wavelength 360 nm.

EXAMPLE 9

A fluorescent compound such as #STR9# was dispersed in a suitable polymer such as polymethylmethacrylate (PMMA) by dissolving both the substances in a suitable solvent such as chloroform. The solvent was evaporated to obtain a viscous solution of the fluorescent compound dispersed in PMMA. The obtained viscous solution was spread on a substrate such as a glass slide either by spin casting or by uniformly applying over it. The solvent from the film was removed by leaving the coated glass slide in the open for about 3 hrs. A typical imaging sample cell consisted of a polymer film coated glass slide above which the required photomask was placed. Pulsed laser (355 nm, third harmonic of Nd:YAG, 20 mJ, 10 ns pulse width) was used as the source of light for the "write" process Laser light was flashed on the photomask for less than a minute. The optimum time was observed to be 15 seconds per cm². The image or information inscribed on the polymer films become visible when they are exposed to low intensity ultraviolet light of wavelength 360 nm. In this case the polymer film is already colored as a result of which the image inscribed on it becomes visible even in the absence of ultraviolet light.

Mechanism of the Fluorescence Imaging Process

Figure 10A:
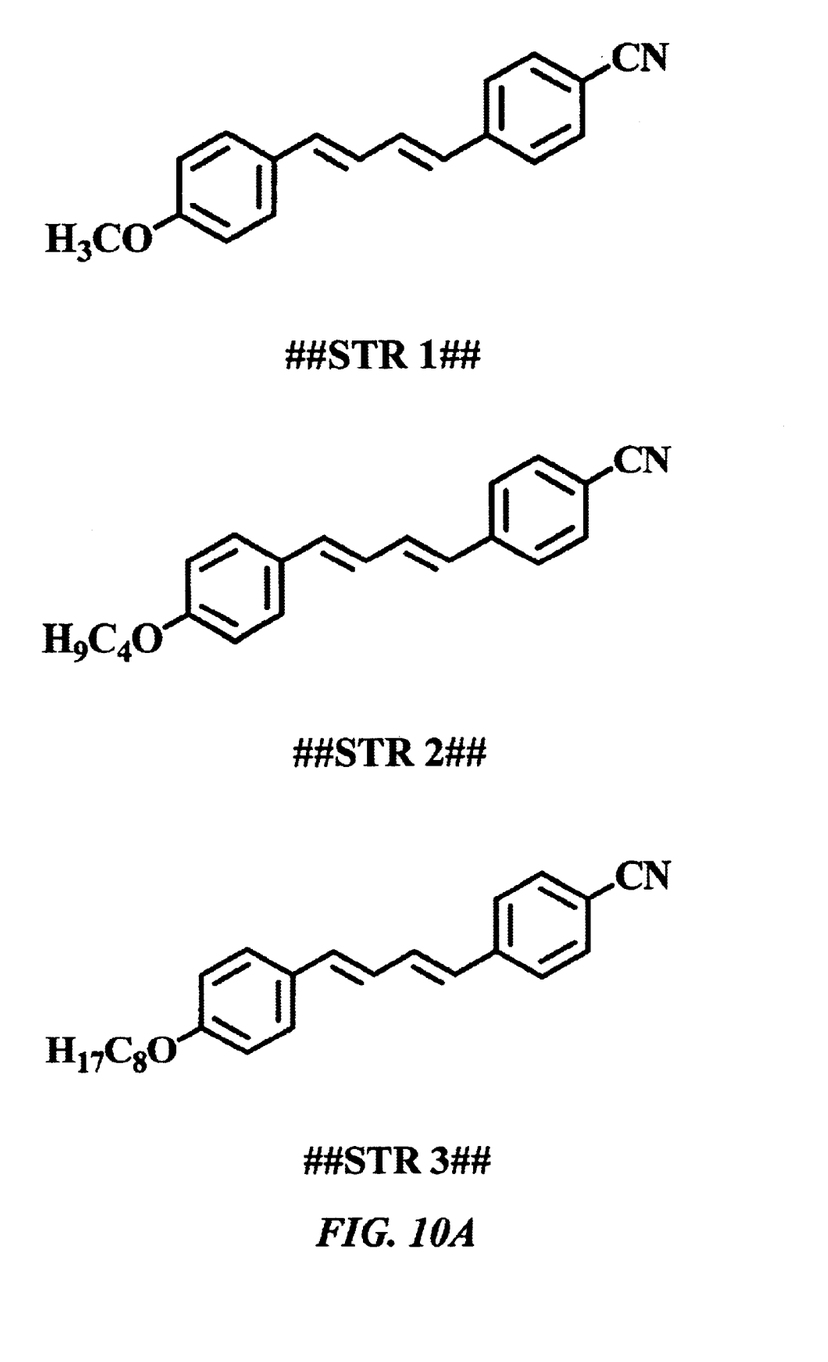
FIGS. 10A–10C: Show the chemical transformation of the compounds taking place during the process of writing.
Figure 10B:
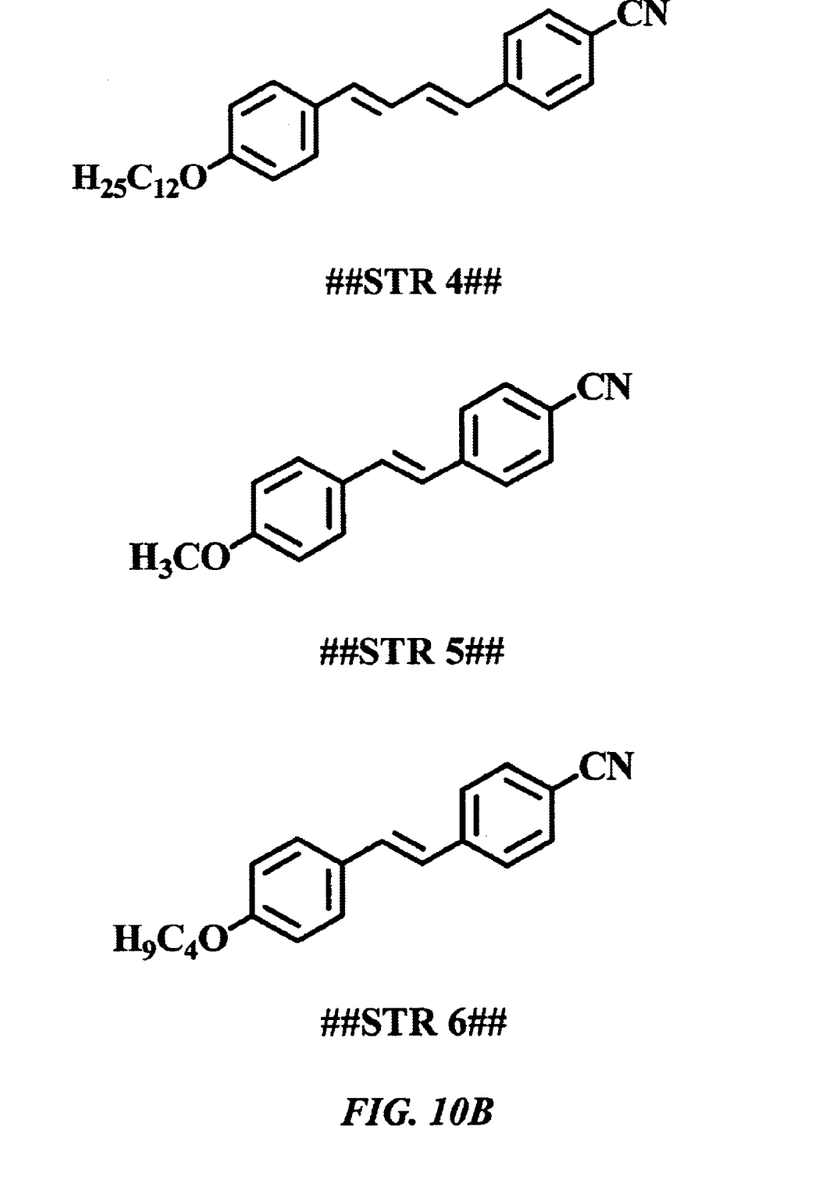
Figure 10C:
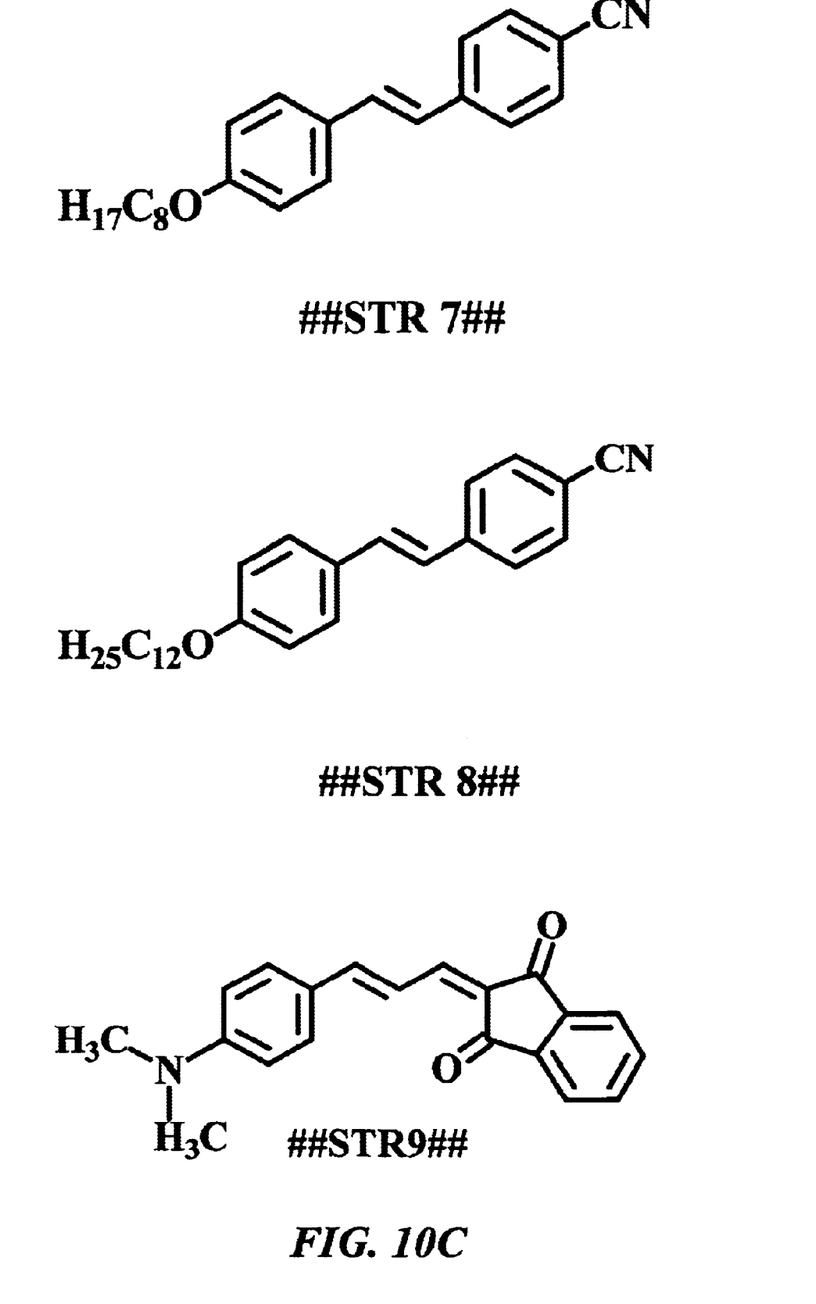

The Nuclear Magnetic Resonance (NMR) analyses of these compounds show that their ground state configuration is EE (FIG. 10). Study on the photophysical properties of these compounds in solution show that their EE form has an absorption maximum centered at 360 nm and an emission maximum centered at 450 nm (Blue fluorescence). Upon photolysis using radiation in the range 350–360 nm, the EE form was found to undergo thermally irreversible isomerization to yield their EZ and ZE forms. This process was found to occur until a photostationary state (PSS1) consisting of a mixture of EZ (50%), ZE (15%) and EE (35%) forms. The EZ and ZE forms of these compounds were isolated using HPLC techniques and were characterized using COSY and NOESY NMR analyses. Upon irradiation of this mixture (PSS1) using a high intensity radiation such as 355 nm laser (third harmonic of Nd:YAG 1064 nm laser) the reaction further proceeded causing a cleavage of the isomers to yield the corresponding benzaldehyde. Benzaldehyde formation was confirmed by isolating it using HPLC and characterizing it. Both photoisomers, EZ and ZE, as well as benzaldehyde are non fluorescent. The fluorescent properties of these compounds are similar in a polymer matrix such as in polymethylmethacrylate (PMMA). Upon photolysis of a blue fluorescent film of the EE form, initially the photoisomers are generated and on subsequent irradiation they undergo transformation to benzaldehyde causing non-fluorescent marks. The non-fluorescent marks on the fluorescent film are clearly visible when exposed to the low intensity UV radiation. The writing process is basically formation of non-fluorescent marks on a blue fluorescent film. A suitable photomask is placed between the photolysing light and the polymer film to obtain the required image. The absorption changes associated with these processes are depicted below.

Advantages of the Present Invention

The fluorescent polymer film based labeling materials described in this, invention possess good properties making them highly applicable as security and anti-counterfeit labels.

1. The fluorescence imaging or writing offered by these materials remains permanent, thermally irreversible and invisible under visible light. The invisible nature of the writing makes them applicable as secret coding materials.
2. The image created does not get erased or diminished in clarity even on long exposure to low intensity UV light used for the reading process.
3. The material, being polymer based, is free from attack by moisture and stays inert under normal conditions, making the preservation of processed films quite easy.

4. The writing process being possible only by using high intensity UV light makes r the writing process expensive and difficult. This however becomes an advantage in view of its application as a medium for security coding. Expensive and sophisticated writing processes considerably reduce chances of duplicating the security labels. The reading process, by simply placing the labels under low intensity UV radiation, makes the detection and identification of the authenticity of a product very easy.

5. The film preparation procedure is very simple.

6. The image created on such polymer films cannot be altered or erased and any attempt to do so will only damage the label. This will make it impossible to duplicate these labels or products bearing them.

7. The 4-alkyloxy-4'cyano-1,4-diphenylbutadiene derivatives form a new class of liquid crystalline materials and can find applications in most areas where liquid crystals are used such as display devices and optical switching.

8. These liquid crystals can be photochemically switched from their liquid crystalline to isotropic phase, isothermally in a reversible manner making them potentially useful in optical switching and photoimaging devices.

9. These materials show strong solid state fluorescence making them potentially useful in development of organic light emitting diodes.

What is claimed is:

1. An information carrying substrate applicable to a surface of a product for authenticating the product, said substrate comprising 50 to 99.999% by weight of a film forming material, 0.001 to 5% by weight of a photo-switchable fluorescent compound uniformly dispersed in said film forming material, the photo-switchable fluorescent compound possessing strong solid state fluorescence in the presence of ultraviolet light and having the general formula:

wherein $R_1$ and $R_2$ are substituted phenyl groups and n=2 to 3, and wherein the photo-switchable fluorescent compound fluoresces reversibly in the presence of light at a wavelength in the range of 390 to 700 nm and amplitude below 0.5 mJ/pulse and is rendered substantially non-fluorescent in the presence of ultraviolet light upon irradiation by light at a wavelength in the range of 390 to 700 nm and amplitude above 2 mJ/pulse.

2. An information carrying substrate as claimed in claim 1, wherein the substituents are selected from the group consisting of H, CN, F, $NO_2$, Br, Cl, $CH_3$, $N(CH_3)_2$, indanedione, barbituric acid, malonodinitrile, meldrums acid, $O(CH_2)_X CH_3$; where X=0 to 18.

3. An information carrying substrate as claimed in claim 2, wherein the substituents are $O(CH_2)_X CH_3$; wherein X=0 to 12 and CN.

4. An information carrying substrate as claimed in claim 1, wherein said photo-switchable fluorescent compound possess strong solid state fluorescence.

5. An information carrying substrate as claimed in claim 1, wherein said photo-switchable fluorescent compound is capable of being switched thermally and photo-chemically.

6. An information carrying substrate as claimed in claim 1, wherein the film forming material is selected from the group comprising of polymethylmethacrylate, polystyrene and polyvinylalcohol or mixtures thereof.

7. An information carrying substrate as claimed in claim 1, wherein the film forming material and the photo-switchable fluorescent compound are soluble in a solvent selected from the group consisting of acetone, chloroform, ethylacetate, dichloromethane and methanol.

8. An information carrying substrate as claimed in claim 1, wherein the substrate is applied on surfaces selected from the group comprising of metal, plastic, glass, polymer sheets or any other surface which is not damaged or is soluble in the solvent used.

9. An information carrying substrate as claimed in claim 1, wherein the information carrying substrate is non-fluorescent in ordinary light but fluoresces under low intensity UV light source.

10. An information carrying substrate as claimed in claim 1, wherein the fluorescence of the substrate in low intensity UV radiation is irreversible switched OFF when the substrate is subjected to high intensity UV source.

11. An information carrying substrate as claimed in claim 1, wherein the information is recorded on the substrate by placing an information containing mask in front of the coated substrate and irradiating with a high intensity UV source.

12. An information carrying substrate as claimed in claim 11, wherein the UV light source emits light having wavelength in the range of 390 to 700 nm and amplitude above 2 mJ/Pulse.

13. An information carrying substrate as claimed in claim 1, wherein the photo-switchable fluorescent compounds are selected from the group consisting of 4-cyano, 4-methoxy-1,4-diphenylbutadiene; 4-cyano, 4-butyloxy-1,4-diphenylbutadiene; 4-cyano, 4-octyloxy-1,4-diphenylbutadiene; and 4-cyano, 4-octyloxy-1,4-diphenylbutadiene.

* * * * *